Figure 1:
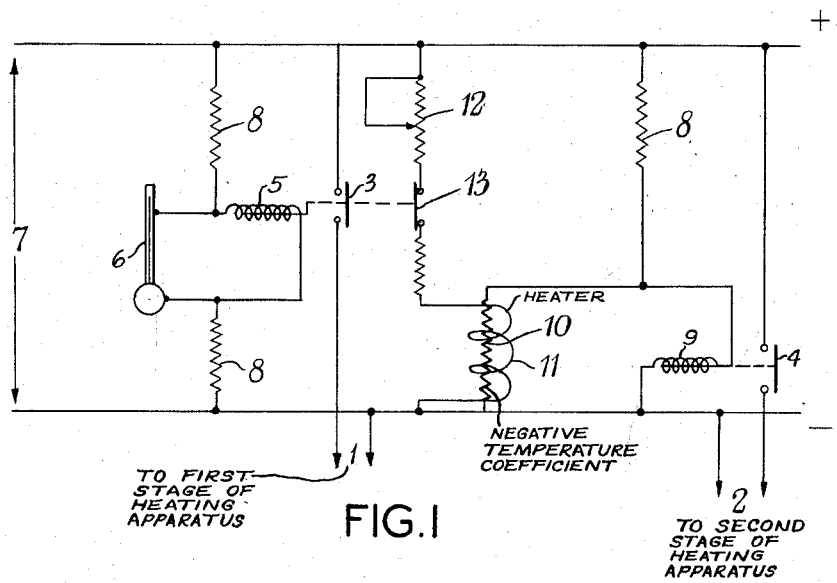

United States Patent Office 3,122,316
Patented Feb. 25, 1964

3,122,316
PLURAL STAGE TEMPERATURE CONTROL
Bertram Robert Leigh, Rickmansworth, and Leonard George Thomas, London, England, assignors to J. Stone & Company (Deptford) Limited, London, England
Filed Apr. 20, 1961, Ser. No. 104,346
Claims priority, application Great Britain Apr. 26, 1960
5 Claims. (Cl. 236—1)

This invention concerns improvements relating to temperature control, particularly but not exclusively control of the temperature of an electrically heated railway vehicle.

In a known system for heating such a vehicle, heating means common to the whole vehicle is divided into two or three banks. Thermostats within the vehicle control respective banks, but second-bank and third-bank thermostats act largely as time-delay devices, so that the second and third heating banks or stages are switched on at successive intervals after the first and are similarly switched off. If, however, the first or second bank or stage does not remain on for the full period, then the further bank or banks is not switched on. Typically, the interval may be about one minute, but it will vary with temperature conditions and will also depend in each case on the cycling period of the preceding thermostat and stage.

In this system, a supplementary bias heater has been provided on each of the second and third thermostats. When the first thermostat switches on the first stage, it also de-energises the supplementary heater of the second thermostat. In effect this causes the setting of the latter to rise, although with a delay, and the second bank or stage to be switched on, while the supplementary heater of the third thermostat is de-energised with a similar result. If, however, the heating by the first stage more than meets requirements, the first thermostat will quickly switch it off again and re-energise the supplementary heater of the second thermostat before the second stage has been switched on. The same thing applies to the second and third thermostats. Should the temperature in the vehicle move widely away from the regulated value, the second and third thermostats can act to switch off their heating stages independently of the first thermostat.

The present invention seeks to provide a temperature-control system which gives a similar result, but with certain advantages or facilities in the mode of operation. In accordance with the invention, in a system for the control of heating means divided into two or more stages or other parts, the switching on of at least one part with a delay in relation to another part is effected with the assistance of a temperature-sensitive resistance element having a low resistance at its working temperature and a high resistance at normal room or ambient temperature, the said element being provided with a bias heater which is arranged to be de-energised when the said other part of the heating means is switched on by thermostatic action. Suitably, the said resistance element is arranged so that it will short circuit a relay winding, controlling a part of the heating means, when its bias heater is energised and its temperature is high. A significant difference from the above-described known system is that the resistance of the said element decreases gradually as it heats up, whereas the resistance offered by a thermostat changes suddenly from approximately infinity to zero at a particular temperature.

Figure 2:
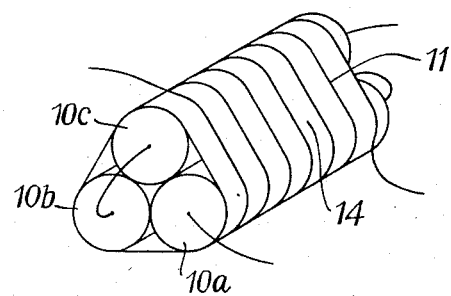

One manner of carrying the invention into effect will now be more fully described by way of example and with reference to the accompanying drawing, in which:

FIGURE 1 is a circuit diagram for the system, and FIGURE 2 is a diagrammatic perspective view of an assemblage of resistance units with a common bias heater.

The system to be described is intended to control two or more banks or stages of electrical heaters (not shown) in a railway coach, these stages being switched on and off by respective contactors at 1, 2, themselves energised by the contacts 3, 4 of respective relays. The winding 5 of the first-stage relay, whose main contacts 3 are normally open, is connected in parallel with a thermostat 6 across the supply 7 in series with substantial resistance 8. The thermostat may be of mercury-in-glass type, its contact-closure point being suitably about 23° C. No bias heater need be provided on the thermostat. The winding 9 of the normally open relay for the second stage is similarly connected across the supply 7, but in parallel with a temperature-sensitive resistance element 10 to be described. A bias heater 11 for this element is itself connected across the supply 7 through a variable setting resistance 12 and normally closed auxiliary contacts 13 of the first-stage relay.

The temperature-sensitive element 10 suitably consists of one or more of the elements sold under the registered trademark "Brimistor" by Messrs. Standard Telephones and Cables Ltd. This element has a low resistance at its maximum operating temperature of about 200° C. and a high resistance at a temperature of about 20° C., the resistance ratio for this temperature variation ranging from 80:1 to 20:1 according to the type of element. The bias heater 11 wound on the element 10 may be of Nichrome wire.

The manner of operation is as follows, assuming that the contactors at 1, 2 are open and that the temperature in the coach is falling. When the contacts of the thermostat 6 open, the hitherto short-circuited winding 5 of the first-stage relay is energised and its main contacts 3 are closed, causing the associated contactor at 1 to switch on the first stage. At the same time, however, the auxiliary contacts 13 of the said relay are opened, so that the bias heater 11 on the temperature-sensitive element 10 is de-energised. The temperature of the element 10 falls and its resistance gradually increases until, after a predeterminable delay, the winding 9 of the second-stage relay is energised, so that it closes its contacts 4 and the second stage is switched on by the associated contactor at 2. This action will not happen if the contacts of the thermostat 6 reclose before the second-stage relay contacts 4 have closed. The first-stage relay, in addition to causing, by the opening of its contacts 3, the switching off of the first stage, will also, by the closing of its contacts 13, re-energise the bias heater 11, so that the temperature of the resistance element 10 will rise and its resistance fall and, after a predetermined delay, the second-stage relay will open its contacts 4 and cause the switching off of the second stage. There is thus a delay in the response of the second-stage relay for opening as well as closing and the double delay is achieved in very simple manner.

It will be seen that, in this system, the ratio between the pull-in and drop-out voltages for the second-bank relay, whose winding 9 is shunted by the element 10, is an important factor in the design. It will also be noted that the element 10 is itself heated by the current which it diverts from the relay winding 9. This self-heating is, however, kept low in relation to the effect of the heater 11.

The length of the delay depends largely on the physical size and shape of the temperature-sensitive element 10. The time constant of the said element for heating or cooling, namely the product of its mass and specific heat divided by the conductivity to the outside, is less in the case of small units. For a small physical size, use may be made of a number of small juxtaposed units connected in series, the said number being selected to give the required total resistance, while limiting the aforesaid self-heating. In all cases, the bias heater 11 should be evenly distributed on the unit or units.

FIGURE 2 illustrates a suitable form of assemblage of three such units 10a, 10b and 10c connected electrically in series and insulated from each other by a thin layer of glass tape where they touch. The whole assemblage is wound with a thin layer 14 of glass tape over which the bias heater 11 is then wound. With such an assemblage, a large mass of resistance material, in relation to its cooling surface area, is obtained, so that the heating and cooling time constant is considerably greater than with a single unit. A long time delay for the opening and closing of the associated relay, even of the order of 10 to 30 minutes if such is required, can be obtained.

Long heating time constants and long time delays can additionally or alternatively be secured by wrapping the element 10, with its heater 11, in heat insulating material. Very long time constants can be secured by surrounding with heat insulating material an assemblage of units such as is shown in FIGURE 2. In either case, some modifications in circuit parameters, especially as regards the design of the heater 11, will be required when such insulating material is added.

A system such as has been described can be made tolerant to wide supply voltage variations (say within 95 to 145 v. for a supply at a nominal 110 v.) and to ambient temperature changes within a range of, say 0 to 35° C. However, when there are very large ambient temperature variations, the system can operate similarly to the known system and the second stage can be switched on and off independently of the heating by the bias heater 11.

By the provision of a further temperature-sensitive element similar to the element 10 with its heater 11, a further relay, contactor and heating stage can be similarly controlled. The system can also be applied, if required, to the control of apparatus comprising heating and cooling means or cooling means.

We claim:
1. A system adapted for the control of electrical apparatus, divided into at least two parts, to be switched on in succession, for influencing temperature, said system comprising, for each part, switching means adapted to control the switching on and off of the part, a thermostatic device connected with the switching means for a first part and arranged to control that switching means, a temperature-sensitive resistance element connected with the switching means for a second part and arranged to control that switching means, the said resistance element being of the kind having a low resistance at its working temperature and a high resistance at normal ambient temperature, and a bias heater provided on the said resistance element and arranged to be de-energised and energised by the said switching means for a first part when the said switching means operates to switch on and switch off that part, the time required by the said bias heated resistance element to cool down and heat up respectively producing a delay between the operation of the switching means for the parts both on their successive operation for switching on the parts and on their successive operation for switching off the parts.

2. A system adapted for the control of heating apparatus divided into at least two parts to be switched on in succession, said system comprising for each part, a relay having main contacts controlling the switching on and off of a respective such part, a thermostatic device connected with a winding of the relay for a first part and arranged thereby to control the energisation of the said relay in response to temperature, a temperature-sensitive resistance element connected to a winding of the relay for a second part and arranged thereby to control the energisation of that relay, the said resistance element being of the kind having a low resistance at its working temperature and a high resistance at normal ambient temperature, and a bias heater provided on the said resistance element and connected to auxiliary contacts of the relay for the first part, the said auxiliary contacts being closed to energise the said bias heater when the aforesaid main contacts are open and conversely, the time required by the bias heated resistance element to cool down and heat up respectively causing a delay to be produced between the operation of the relays for the parts of the heating apparatus both on their successive operation for switching on the parts and on their operation for switching off the parts.

3. A system according to claim 2, and means connecting said resistance element in parallel with the said winding of the second-named relay, so that it will substantially short circuit the said winding when its bias heater is energised and its temperature has reached a high value.

4. A system according to claim 2, wherein the second-named relay has its main contacts normally open and its auxiliary contacts normally closed, and the second-named relay has its contacts normally open.

5. A system according to claim 1, wherein the temperature-sensitive resistance element consists of an assemblage of smaller juxtaposed units, the bias heater being common to the said assemblage.

References Cited in the file of this patent

UNITED STATES PATENTS

| | | |
|---|---|---|
| 2,482,820 | Wolfson | Sept. 27, 1949 |
| 2,951,640 | Buchanan | Sept. 6, 1960 |
| 2,958,755 | Miller | Nov. 1, 1960 |